United States Patent [19]

Glowny et al.

[11] Patent Number: 5,491,791
[45] Date of Patent: Feb. 13, 1996

[54] SYSTEM AND METHOD FOR REMOTE WORKSTATION MONITORING WITHIN A DISTRIBUTED COMPUTING ENVIRONMENT

[75] Inventors: David A. Glowny; John C. Kistenmacher, both of Naugatuck, Conn.; Caryl M. Rahn, Poughkeepsie, N.Y.; Jerry C. Thomas, Danbury, Conn.

[73] Assignee: International Business Machines Corporation, Armonk, N.Y.

[21] Appl. No.: 372,786

[22] Filed: Jan. 13, 1995

[51] Int. Cl.[6] .................................................. G06F 11/00
[52] U.S. Cl. .................. 395/183.13; 395/183.16; 395/184.01; 395/183.02
[58] Field of Search .................. 371/16.1; 395/575, 395/183.01, 183.02, 183.06, 183.13, 183.22, 185.01, 184.01

[56] References Cited

U.S. PATENT DOCUMENTS

| | | | |
|---|---|---|---|
| 3,910,322 | 10/1975 | Hardesty, Jr. et al. | |
| 4,507,777 | 3/1985 | Tucker et al. | 370/16 |
| 4,558,413 | 12/1985 | Schmidt et al. | 364/300 |
| 4,654,852 | 3/1987 | Bentley et al. | 371/29 |
| 4,817,080 | 3/1989 | Soha | 370/17.13 |
| 4,943,963 | 7/1990 | Waechter et al. | 370/94.1 |
| 4,959,849 | 9/1990 | Bhusri | 379/32 |
| 5,036,514 | 7/1991 | Downes et al. | 371/51 |
| 5,072,370 | 12/1991 | Durdik | 395/575 |
| 5,081,627 | 1/1992 | Yu | 371/29.1 |
| 5,090,014 | 2/1992 | Polich et al. | 371/15.1 |
| 5,111,460 | 5/1992 | Botzenhardt et al. | 371/29.1 |
| 5,119,489 | 6/1992 | Bond et al. | 395/575 |
| 5,123,017 | 6/1992 | Simpkins et al. | 371/15.1 |
| 5,179,695 | 1/1993 | Deer et al. | 395/575 |
| 5,274,797 | 12/1993 | Barlow et al. | 395/575 |
| 5,307,354 | 4/1994 | Cramer et al. | 371/11.2 |
| 5,367,667 | 11/1994 | Wahlquist et al. | 395/575 |
| 5,377,196 | 12/1994 | Godlew et al. | 371/20.1 |
| 5,379,409 | 1/1995 | Ishikawa | 395/575 |
| 5,388,252 | 2/1995 | Dreste et al. | 395/575 |

OTHER PUBLICATIONS

Bruce L. Hitson, Knowledge–Based Monitoring and Control of Distributed Systems, Computer Systems Labratory, Technical Report CSL–TR–90–414, Feb. 1990.

Clark, D., "Computer Firms to Unveil Version of PC Network Management Tool", The Wall Street Journal, p. B6, Oct. 1993.

McCarthy, V., "Management–ready PCs debut, but buyers advised to beware", Oct. 1993.

Primary Examiner—Robert W. Beausoliel, Jr.
Assistant Examiner—Alan M. Fisch
Attorney, Agent, or Firm—William A. Kinnaman, Jr.; Heslin & Rothenberg

[57] ABSTRACT

An automated system and method for remote workstation inventorying and monitoring within a distributed computing environment are presented. The computing environment includes a plurality of workstations interconnected by a network. Each workstation has basic peer-to-peer communication ability providing remote file transfer and remote command execution. A designated non-server workstation operates as a monitor for generating an execute command to be sent to each remote workstation to undergo monitoring. At the remote workstation a diagnostic routine is executed for monitoring at least one configuration characteristic of the remote workstation and for providing based thereon a report file. The report file is then returned to the monitor workstation for analysis, including compiling of an appropriate report and possible issuance of an alert message.

19 Claims, 6 Drawing Sheets

5,491,791

SYSTEM AND METHOD FOR REMOTE WORKSTATION MONITORING WITHIN A DISTRIBUTED COMPUTING ENVIRONMENT

TECHNICAL FIELD

The present invention relates to information processing systems and, more particularly, to system utilities for information processing systems. Specifically, the present invention relates to a system and method for remotely inventorying and monitoring hardware, software, etc., within a collection of interconnected information processing systems.

BACKGROUND ART

Computer solutions are increasingly implemented in the form of distributed computer processors connected by a communications network. An example of such a network is a series of interconnected workstations such as the IBM Personal System/2 (IBM PS/2) computer or the IBM RISC system/6000 workstation (Personal System/2, PS/2, and RISC System/6000 are trademarks of the IBM Corporation). These workstations may be connected by a local area network (LAN) operating as a token ring, ethernet, or other form of network.

In attempting to manage and maintain a set of commonly shared workstations in a local area network used for distributed computing, problems such as system outages, reduced availability or degraded performance can often occur. Frequently, the origin of such problems may be an inappropriate configuration change to the hardware or software on a workstation in the LAN. Although such problems can be analyzed and recovered from by manually correcting the workstation configuration, investigating each problem and determining its cause is often a time-consuming process since it is typically not easy to identify the workstation where the inappropriate configuration change was made. Additionally, even after identifying the affected workstation, when the inappropriate change was made or by whom often remain unknown. Thus, although the workstation configuration could be corrected to resolve the immediate problem, the same user might return later to the same workstation or to another workstation and make the same mistake again, thereby repeatedly disabling or impairing the distributed computing system.

Limiting access to workstations is typically not a viable option in the work environment. In some cases, users have perfectly valid reasons for needing to change the hardware or software configuration on a workstation, and know how to perform the procedures correctly. In other cases, however, a workstation configuration could be updated incorrectly for one of a variety of reasons, including: the user did not know how to correctly update the workstation; the user understood how to update the workstation, but made an inadvertent mistake such as a typographical error; the user "borrowed" a piece of critical equipment for use in another workstation; the configuration was corrupted by defective hardware or software; or deliberate user mischief may have occurred, whether frivolous or malicious.

A wide array of diagnostic tools exists for inventorying and monitoring hardware and software. However, most of these diagnostic tools must be run manually and locally on each individual workstation. Further, report files are generated and typically saved on each individual workstation, rather than in a consolidated database.

On a system level, solutions typically use "passive" monitoring techniques in which a server workstation listens for error signals sent by other stations in the network. When such a technique is employed, it relies on the other stations to accurately report errors as they occur. Several disadvantages to this approach are apparent. Specifically, because each station is separately programmed to report error conditions, it is difficult to administer monitor changes since each individual station is affected if new types of error monitoring need to be added to the diagnostic system. In addition, conditions which are not necessarily errors, but which may indicate a potential hazard, may pass undetected. This is because such systems typically report failures only as they occur instead of periodically running selected diagnostic routines. Finally, it may be possible for a user to tamper with an individual workstation and thereby prevent the workstation from reporting an error to the server workstation, while simultaneously proceeding with other deliberate mischief, all the while going undetected.

A few of the existing diagnostic tools can be activated remotely, and can save information to a consolidated database. However, these solutions typically suffer from a number of drawbacks, including: dependence upon a centralized LAN server, which can make the tool unusable in case of failure of a critical workstation or communications link; inability to run the diagnostic tool automatically (i.e., unattended) at a specific time interval; inability to save information on previously reported configuration data; lack of an early warning system to draw attention to potential system problems; lack of tuning parameters or rule databases to adjust the behavior of the diagnostic tools, such as which conditions to report or to ignore; vulnerability to attempts by a malicious user to deceive the tool into reporting no problem, while tampering with a remote workstation; and excessive "false positive" reports where the tool does not tolerate momentary outages at a remote workstation.

The peer-to-peer system and method for remote inventorying and monitoring presented herein address the deficiencies of the above-discussed existing art in the distributed processing environment.

DISCLOSURE OF INVENTION

Briefly described, the present invention comprises in one aspect a monitor system for use in a distributed computing environment wherein a plurality of workstations, including a local workstation and a remote workstation, are interconnected by a network. The monitor system, which allows for monitoring of the remote workstation from the local workstation, includes communication means at each workstation of the plurality of workstations for communicating via the network with the other workstations in the distributed computing environment. A diagnostic routine is disposed at the remote workstation for monitoring a configuration characteristic of the remote workstation and for providing based thereon a report file. The diagnostic routine is responsive to an execute command sent from the local workstation to the remote workstation via the communication means. The communication means is operable to initiate from the local workstation execution of the diagnostic routine and to transfer the report file from the remote workstation to the local workstation. The local workstation includes a monitor routine for generating the execute command to be sent to the remote workstation via the communication means and an analysis routine for analyzing the resultant report file transferred thereto.

In another aspect, an automated monitor method is presented for a distributed computing environment that contains a plurality of workstations, including a local workstation and a remote workstation, interconnected by a network. The automated method monitors from the local workstation at least one configuration characteristic of the remote workstation. The method includes the steps of: generating an execute command at the local workstation and transferring the execute command to the remote workstation; in response to the generating step, automatically executing at the remote workstation a diagnostic routine to monitor a configuration characteristic of the remote workstation and for providing based thereon a representative report file; transferring the representative report file from the remote workstation to the local workstation; and analyzing at the local workstation the representative report file transferred from the remote workstation.

To Summarize, the automated system and method for remote workstation inventorying and monitoring presented herein can eliminate a significant amount of the manual effort otherwise required to run diagnostic tools and search through multiple workstations to identify an underlying cause of a system problem. With this novel system and method, the availability and performance of a local area network can be improved. In addition, preventive procedures such as virus scans can be more readily performed, thereby facilitating early problem detection.

Indirectly, the system and method can assist all users of the distributed computing system to work more efficiently since system interruptions can be reduced, thus ensuring a normal, stable computing environment. In cases where a system problem may have been caused by an inappropriate hardware or software configuration change, the present invention facilitates quick identifying of recent configuration changes on the workstations comprising the distributed computing environment. The system and method can be readily configured by one of ordinary skill in the art to implement one or more commercially available, diagnostic routines such as those mentioned herein below.

BRIEF DESCRIPTION OF DRAWINGS

These and other objects, advantages and features of the present invention will be more readily understood from the following detailed description of certain preferred embodiments of the invention, when considered in conjunction with the accompanying drawings in which.

BEST MODE FOR CARRYING OUT THE INVENTION

Figure 1:
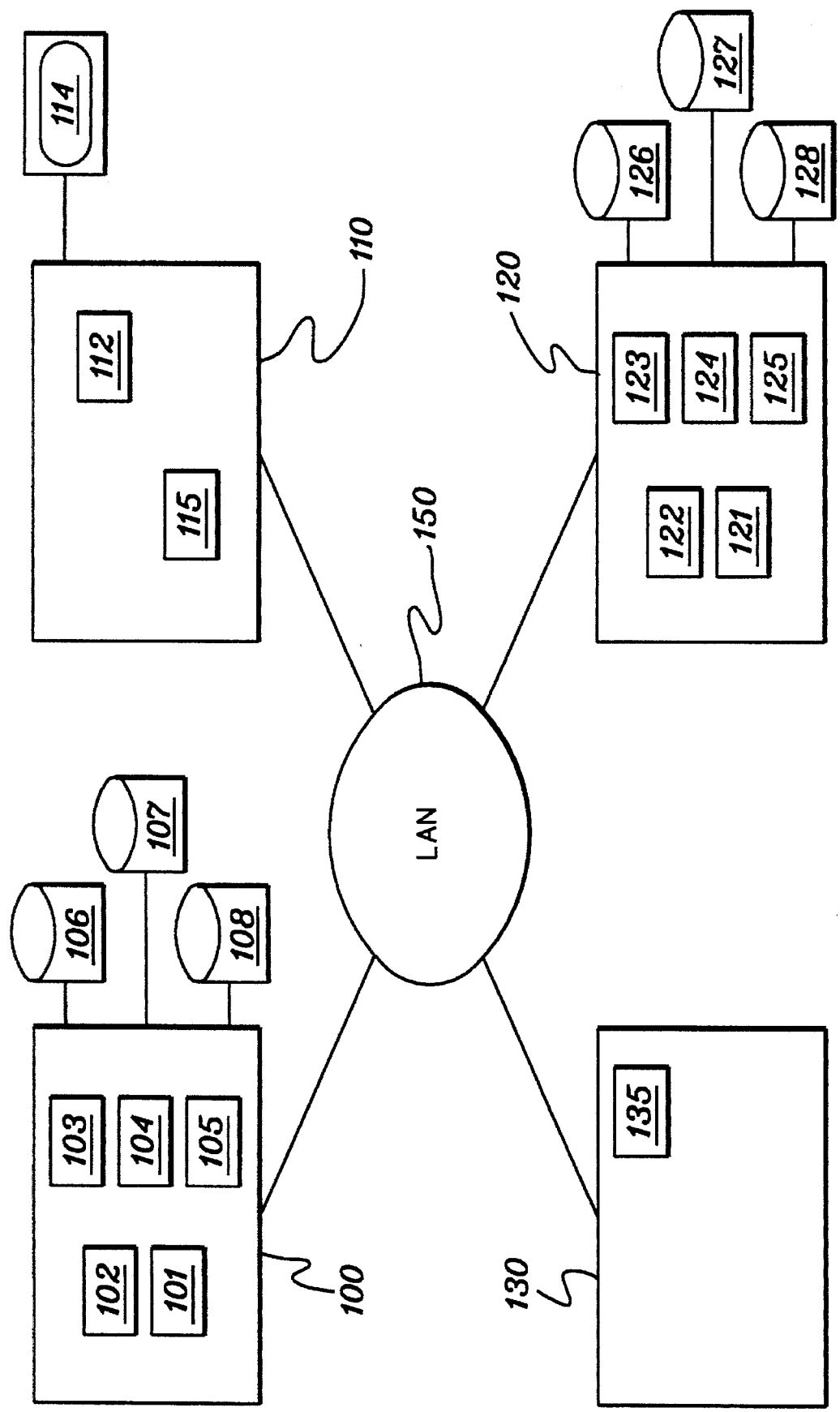
FIG. 1 is a block diagram of a distributed computing system incorporating the present invention.

This invention comprises a system and method for inventorying and monitoring one or more workstations in a distributed computing system, automatically and remotely. The information obtained can be used to more quickly and accurately identify the cause of a problem in the distributed computing system. The particular diagnostic routine employed can be assembled by combining portions of existing, commercially available programs. Such programs are typically used independently to perform one or more of the following individual tasks:

- analyze the hardware configuration on a workstation, and generate a report file which lists installed features and adapter cards;
- analyze the software configuration on a workstation, and generate a report file which lists installed software components and their version levels;
- analyze the communications routing map of a workstation, and verify that lists are defined correctly and are operational or else report detected errors;
- check the file systems and databases on a workstation, to verify that they are fully operational or else report detected errors;
- examine a workstation for previously cataloged computer viruses and report if a virus is found; and
- compute a checksum of the executable programs which make up the diagnostic software to detect and report attempts to replace the software.

As explained further below, a monitor control program is used in accordance with the present invention in combination with programs written to perform remote file transfer and remote command execution by using peer-to-peer communication protocols such as the IBM APPC (LU 6.2) communications protocol between any two arbitrary workstations in the local area network. Use of a predefined. "LAN server" is not required, which gives the solution presented herein additional flexibility and reliability in case of total failure of one or more workstations or communication links. Only basic point-to-point communications is needed. Further, other suitable communications protocol could be employed in place of the IBM APPC (LU 6.2) protocol.

The controlling monitor program refers to its own rules database to determine how frequently to scan a group of workstations; what types of diagnostic analysis should be performed at each workstation; what types of early warnings should be reported to a LAN administrator; etc. Using the remote file transfer and remote command execution programs described below, the monitoring workstation can save the report files for each workstation's configuration in a report database, along with the results of previous scans. After each scan of a workstation grouping, diagnostics can be performed to compare the most recently received data with data received on prior scans. Any configuration changes can be noted and listed in a summary report file, as well as possibly triggering a rule in an early warning system.

A detailed explanation of a system and method in accordance with the present invention is presented below with reference to FIGS. 1–6.

A distributed computing environment to employ a system and method in accordance with the present invention is shown conceptually in FIG. 1. The computing environment comprises a plurality of computing units or workstations 100, 110, 120 & 130, such as personal computers interconnected via a local area network 150. Any number of such processors could be attached depending only on the physical limitations of the network. On each workstation 100, 110, 120 & 130, there is a basic communications routine 105, 115, 125 & 135, respectively, as described in a co-pending, commonly assigned U.S. patent application entitled "System and Method for Remote Software Configuration and Distribution", Ser. No. 07/923,126, which is hereby incorporated herein by reference and described further below. On at least one designated workstation capable of initiating remote inventorying and monitoring in accordance with the present invention, herein either workstation 100 or workstation 120, there exists the following additional components:

- one or more instances of diagnostic software (101, 121),
- one or more instances of analysis software (102, 122),
- a monitor routine (104, 124),
- a control-point arbitration routine (103, 123),
- a rules database (106, 126),
- a report database (107, 127), and
- a summary file (108, 128).

At a designated workstation 110 in the local area network, there exists an alert processing routine 112 and an associated display device 114 for alerting a system administrator of a potential problem. Although only one is shown, it is anticipated that in the local area network there will be a large number of workstations 130 which comprise the client workstations that are the subject of the monitoring system and method presented herein. As shown in FIG. 1, there can be multiple workstations 100 & 120 designated for the monitoring role. Further, although only one workstation 110 is shown, multiple workstations could be designated for receipt of alerts.

There exists a wide variety of commercially available diagnostic software capable of running unattended, without user interaction, that write results into an output file. By way of example, the following utilities are commercially available:

| | |
|---|---|
| CheckIt-Pro (TouchStone Software Corp.) | check hardware configuration |
| SYSLEVEL.EXE (OS/2) | check software configuration |
| APPNV.EXE (OS/2 COMM MGR) | check communications map |
| CHKDSK.EXE (OS/2) | check file systems |
| IBM ANTI-VIRUS Software | check for viruses |
| CRC.EXE (from CompuServe) | check integrity of diagnostic routines. |

The instances of analysis routines should read from input files, and compare them to find reportable conditions such as configuration changes, warnings, and errors. Using existing programs such as DIFF.EXE (OS/2), which compares files for differences, and GREP.EXE (OS/2), which scans files for a given search key, and programmable environments such as REXX (implemented, e.g., on IBM's OS/2) or other shell scripting languages, one of ordinary skill in the art can construct a desired analysis routine for a specific monitoring requirement.

Continuing with FIG. 1, control-point arbitration routines 103, 123 can operate as described in another commonly assigned, co-pending application entitled "Network Management Method Using Redundant Distributed Control Processors," Ser. No. 07/771,063, which is commonly assigned and hereby incorporated herein by reference. If two or more monitoring workstations, such as stations 100 and 120, are running at the same time, these control-point arbitration routines will control which workstation runs the monitoring and which workstation acts as a standby in the event of failure. The control-point arbitration routines can also assist with the synchronization of databases such as those used for rules and report data.

Rules databases 106, 126 are manually configured by the system administrator to direct the work of the monitor program by listing the tasks to be performed, remote workstation(s) to be checked, time interval or schedule between scans, etc. By way of example, the following is a rules database in textual form:

```
#Sample Rules Database

#1. Rule for a workstation

workstation-name                    = ps258
LAN-address                         = 199.33.162.4
maximum-tolerance-for-no-response   = 1 hour
when-no-response                    = summary report to filename

#2. Rule for a workstation group

workstation-group                   = dept34
group-list                          = (ps205, ps206, ps207, ps208)

#3. Rule for a step

step-n e                            = swcheck
diagnostic-program                  = SYSLEVEL.EXE
remove-after-use                    = no
output-file                         = SYSLEVEL.OUT
analysis-program                    = DIFF.EXE

#4. Rule for a simple task

task-n                              = swonly
task-list                           = (swcheck)

#5. Rule for a complex task

```

```
task-name                                      = checkup
tank-list                                      = (swcheck, hwcheck, viruscheck)

#6. Rules for when & where to run tasks

run swanly on ps258 every 4 hours, summary report to filename
run checkup on dept34 at 6pm, summary report to filename
run hwonly on ps258 every hour, alert to ps201

#7. Rules to upgrade diagnostic software
#(These get removed from the database when completed)

install hwcheck on ps271 at next run
install hwcheck on ps272 at next run
```

The report databases 107, 127, are used to hold the copies of the output written by the various diagnostic routines 101, 121. This database is also employed to track a time interval since a remote workstation was last contacted, so that eventually an off-line workstation might trigger a warning alarm. The summary files 108, 128 contain information on reportable conditions identified by the monitor routine 104, 124, and the analysis software 102, 122. Preferably, the summary file should be occasionally checked by a human system administrator. Alert processing software 112 simply waits for a network communications relaying the text of an alert sent from a monitor program 104, 124. Upon receipt of such an alert, the program displays an appropriate message on the display device 114.

Processing in accordance with the present invention can be better understood with reference to the detailed flow diagrams of FIGS. 2–6. Upon initialization 200, the monitor routine reads the rules database for the task, program steps thereof, workstation list and monitor schedule 202, all of which can be readily customized by one of ordinary skill in the art based upon the information provided herein. From this information, a first or next task is obtained according to the schedule 204, along with a next workstation in the list of workstations 206 to be monitored. Note that the list of workstations can comprise either all of client workstations on a given distributed computing system, or only a predesignated portion thereof.

Figure 2:
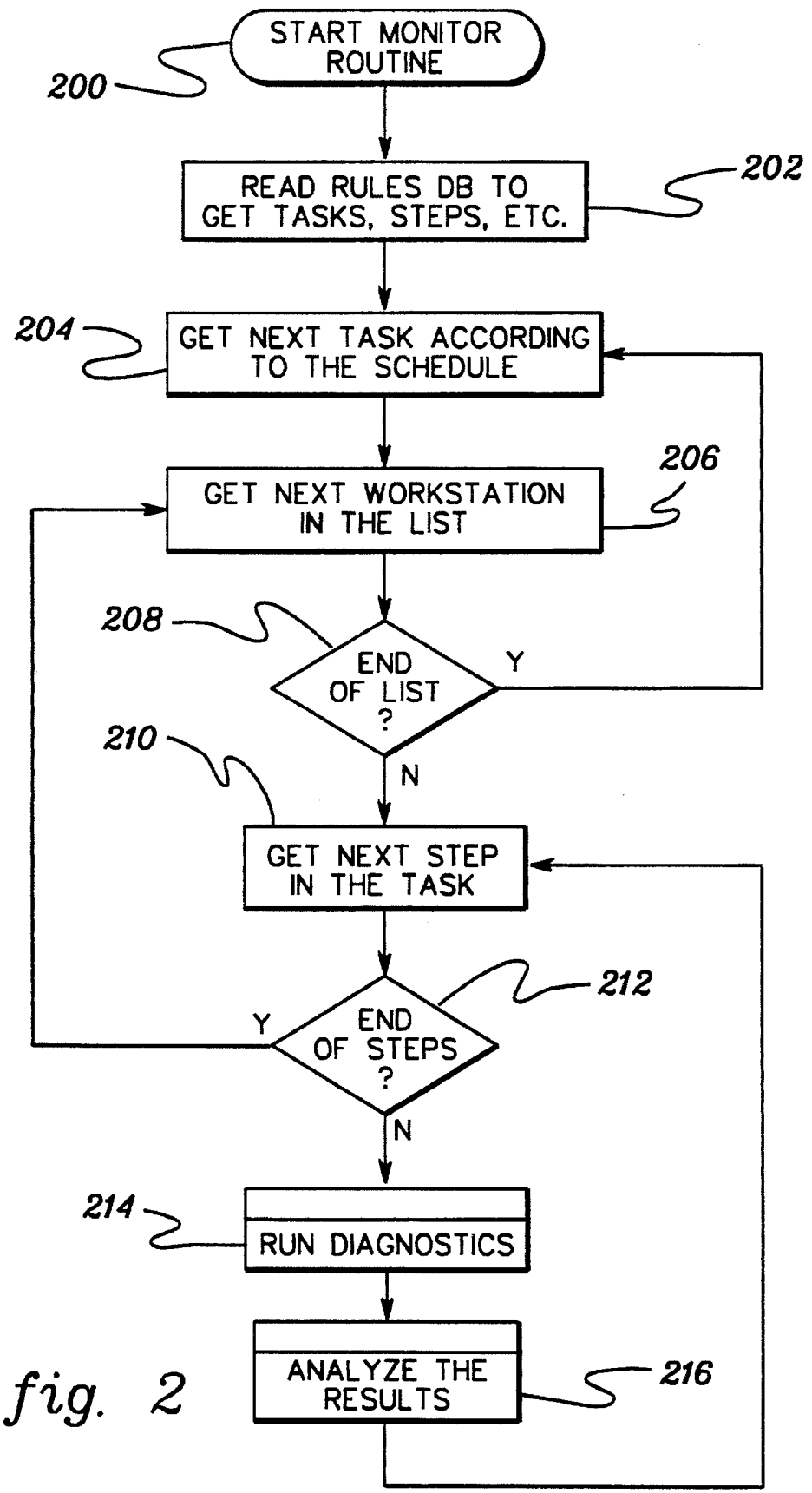
FIG. 2 is a flowchart of one embodiment of a monitor routine in accordance with the present invention.

Inquiry is then made whether all workstations in the list have been processed 208. If so, the routine directs the attaining of a next task according to the read schedule. If no task is presently scheduled, then processing enters a wait state for an interval of time until the next scheduled task. In this regard, note that the flowchart of FIG. 2 is Configured as a permanent running monitor program. Thus, the assumption is that there is always a next task. If only one task exists, that task is repeatedly executed according to the defined schedule. Although not shown, a terminate inquiry could be inserted at any logical point in the flowchart. For example, after processing all workstations in a list, the routine might inquire whether an external terminate signal had been received. Otherwise, processing continues to calculate or recalculate when a next task is scheduled, and at that time to obtain the next task.

Assuming that the list has not been exhausted, a next program step in the given task is obtained 210. Again, each task is comprised of one or more program steps which must be executed for each workstation in the list of workstations. Thus, if all program steps of a particular task have been run for a given workstation 212, processing loops back to obtain a next workstation from the list, and once all workstations have been considered, processing returns to obtain a next scheduled task.

Figure 3:
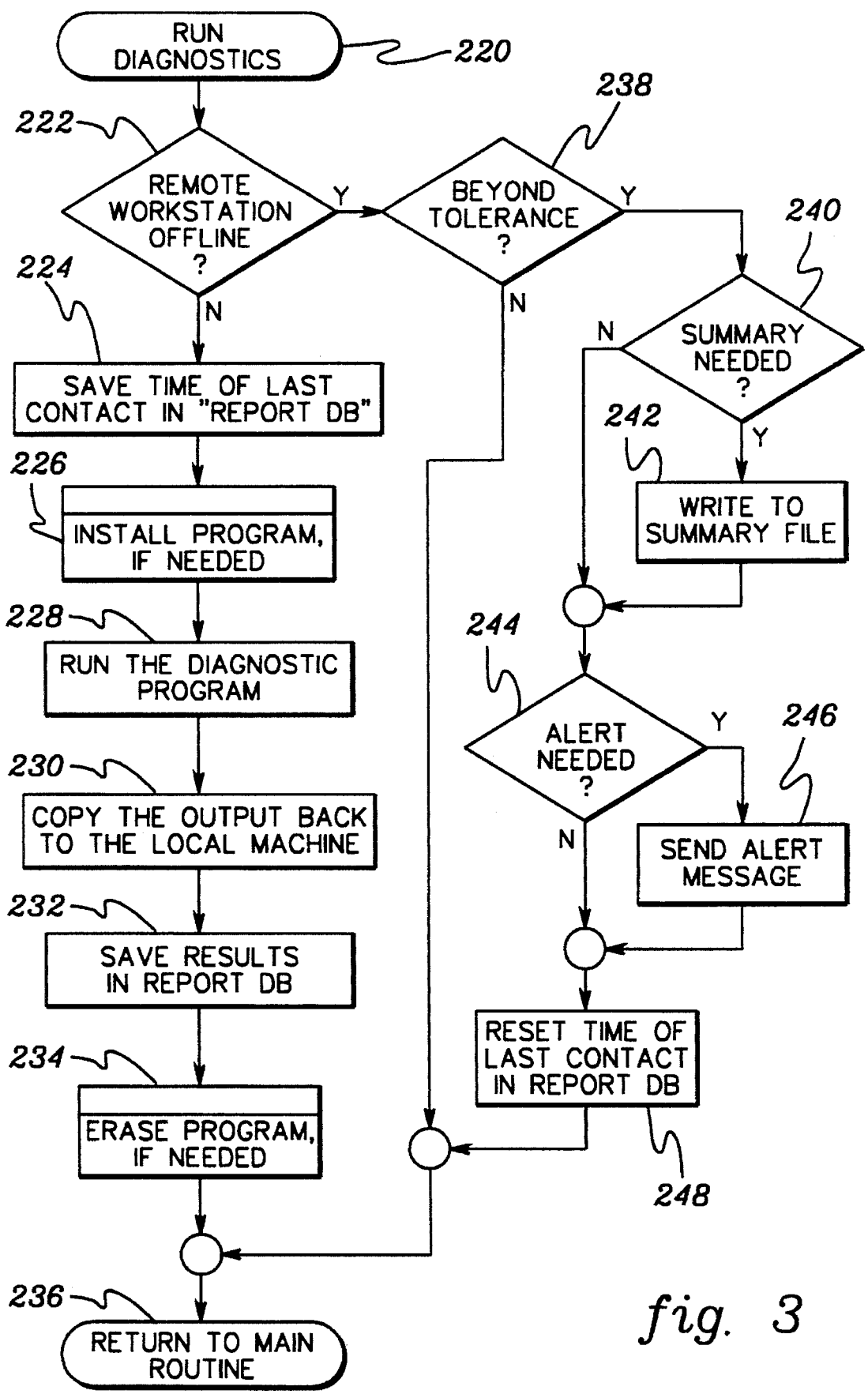
FIG. 3 is a flowchart of one embodiment of the run diagnostics process step of FIG. 2.

Each program step is remotely run on the particular workstation in the list employing run diagnostics 214 such as presented in FIG. 3. Referring to this figure, upon calling the run diagnostics routine 220, inquiry is made whether the particular remote workstation is off-line 222. If the remote workstation under diagnosis is off-line, for example, because the workstation may be rebooting, inquiry is made whether the length of time that the workstation has been off-line exceeds a predefined time interval in the rules database of the monitoring workstation 238 If "no" processing returns 236 to the main monitoring routine of FIG. 2. Conversely, if the tolerance has been exceeded, processing determines from the rules database whether a summary report is needed 240. If yes, the appropriate workstation identification information is written to the summary file 242. Processing then determines from the rules database whether an alert is required 244, and if yes, sends an alert message 246, for example, to a predefined workstation having appropriate alert processing software 112 and associated display device 114 (FIG. 1). After sending the alert, the time of last contact for this workstation is reset in the report database 248 in order that an alert message is not continuously generated.

Thus, if a workstation in the LAN cannot be contacted during a particular scan, the temporary outage would be noted in the report database. Depending upon how many consecutive scans have been done without being able to contact the workstation, the monitoring routine might report this outage in the summary report file or trigger a rule in the early warning system. A table in the monitoring routine's database would be used to determine how many consecutive scans without contacting a workstation would be tolerated before issuing a report or error warning. For example, it might be tolerated to miss a few scan cycles because a workstation could be in the process of rebooting and reloading operating system and communications software.

Information received by the monitoring workstation and saved in the report database could be viewed by the LAN system administrator in either a summary or detailed format. Specific information could then be queried, such as data for a certain workstation, or all data reported within a given time interval. Besides identifying probable causes for noted system symptoms, this capability can also facilitate understanding of problem origin.

Continuing with FIG. 3, if the remote workstation is on-line, then the time of connection to the workstation is saved in the report database 224. Again, the report database holds time stamps on the state of each remote workstation in the list of workstations undergoing the monitoring process (along with the results of the diagnostic routines ). The monitoring routine next determines whether the diagnostic programs to be run are installed at the remote workstation 226. One approach for this is presented in the install program sub-routine 250 of FIG. 4.

Initially, processing determines whether the remote machine has an authentic copy of the diagnostic program to be run. This can be determined using a public domain CRC algorithm to compute the checksum of the diagnostic program at the remote workstation and compare that program with the master copy of the diagnostic software at the machine running the monitor routine 254. If a valid copy already exists at the remote workstation, then the rules database is checked to determine whether an update 258 is scheduled, and if no update is required 260, processing returns to the point of call, i.e., the run diagnostics routine 220 of FIG. 3.

If an update of the diagnostic software at the remote workstation is required 262 or if a valid copy of the diagnostic routine does not presently exist at the remote workstation 256, then the monitoring machine must transfer the diagnostic routine to the remote workstation. This transfer is accomplished in accordance with the teachings of the above-incorporated co-pending application entitled "System and Method for Remote Software Configuration and Distribution, " as explained below.

The remote software distribution technique of this co-pending application is designed to operate without a designated master or server workstation. Communication between the workstations over the LAN is implemented using a peer-to-peer communication protocol such as the IBM APPC (LU 6.2) protocol. Each workstation includes basic communication software in the system unit. The workstations need not be directly connected to each other as long as an indirect path exists between any two workstations, for example, via a third workstation.

The basic communication software is directed to providing two services: remote file transfer and remote command execution. Remote file transfer controls the transfer of data files from one workstation to another, while remote command execution allows one workstation to cause a program or operating system command to be executed at another, remote workstation.

Software installation and configuration services are divided into two main components: the user interface and the installation utilities. The user interface controls all installer interactions collecting information on what is to be installed or maintained and where. The installation utilities provide software functions for local or remote installation and maintenance. Utilities are written to avoid any user interaction, gathering all necessary input parameters from data supplied by the user interface.

There is no limit to the number of workstations that can have or execute the user interface and utilities code. A minimum set of interface programs must reside on the workstation that initiates processing. In particular, the basic communication software for the remote file transfer and remote command execution must be present. None of the other utilities are required since they can be copied or accessed from other workstations as long as the basic communication software is present.

One preferred embodiment of this invention implements as the user interface the facilities of IBM's OS/2 Presentation Manager dialog and message boxes. Presentation Manager programs also provide status information regarding the progress of the software installation or maintenance activity. Data captured by the user interface is used to schedule control software installation and maintenance through the execution of utility functions. By way of example, these utility functions include unpack files from a diskette, copy files from another workstation on the LAN, verify existence of pre-requisite software, write configuration data to a file, read configuration data from a file, check existence of a database, delete a database, create a database, load initial data into a database, bind a database for use with SQL programs, record the installation status of a workstation, edit workstation configuration files, update the configuration files used by communications utilities such as the IBM communication manager, catalog remote database links, and shutdown and reboot a workstation.

In operation, the remote software installation and configuration approach of the co-pending application offers significant advantages over prior systems. Use of an arbitrary point-of-control for local and remote installation increases LAN administrator efficiency. Further, low overhead peer-to-peer remote file transfer and remote command execution provide processing flexibility without the cost and risk of a single server implementation. This decentralized approach can reduce network bottlenecks and performance degradation.

Figure 4:
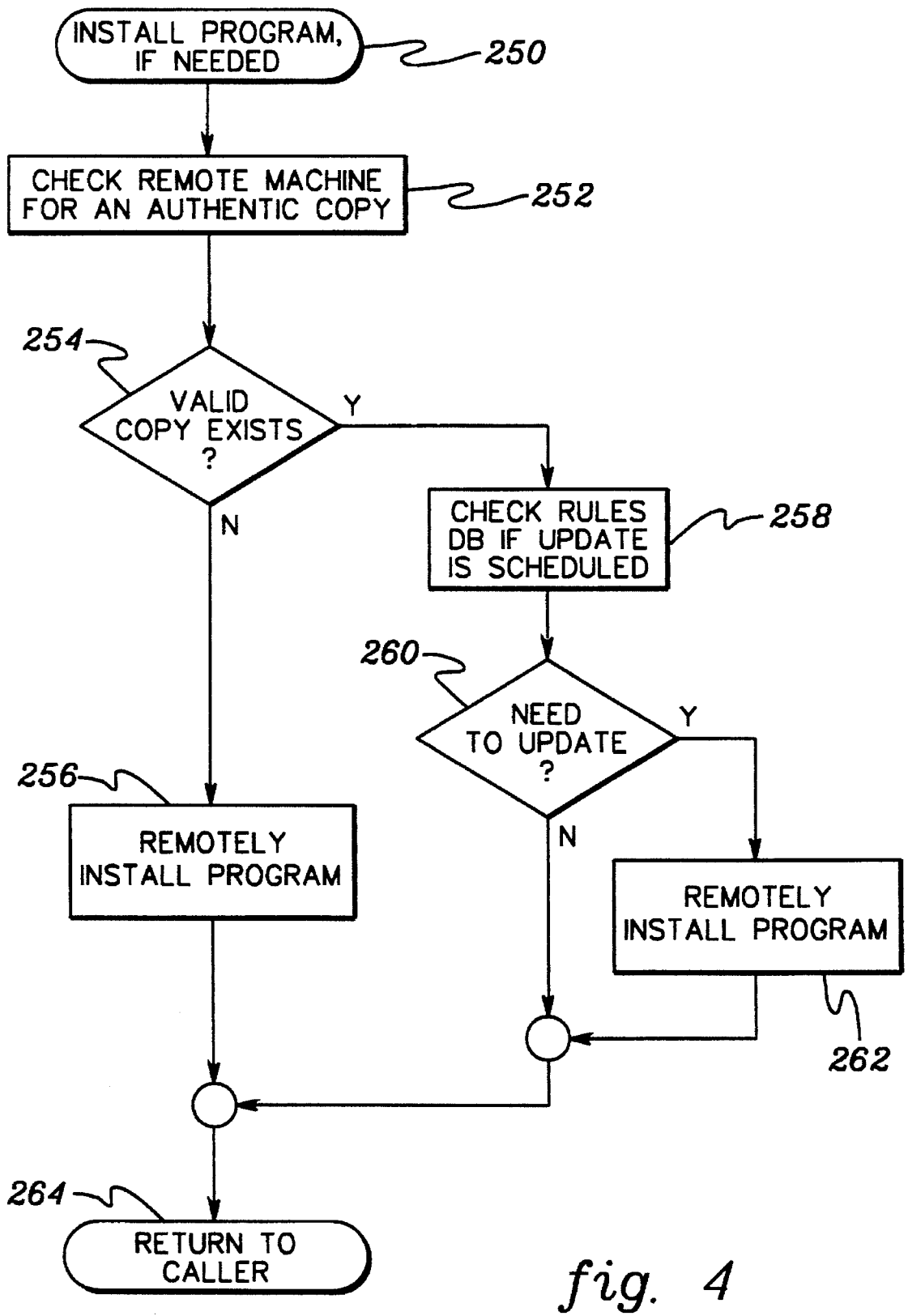
FIG. 4 is a flowchart of one embodiment of the install program process step of FIG. 3.

Completing the flow of FIG. 4, after a valid copy of the diagnostic routine has been installed 256 or updated 262, processing returns to the point of call 264 in the run diagnostic routine of FIG. 3. Continuing with FIG. 3, a signal is next sent to the remote workstation to run the diagnostic routine established thereon 228, after which the remote file transfer mechanism is employed to copy the output file report back to the monitoring workstation 230. Again, remote command execution and remote file transfer are accomplished employing the above-summarized teachings. The returned results of the diagnostic routine are saved in the report database 232 at the monitor machine.

Figure 5:
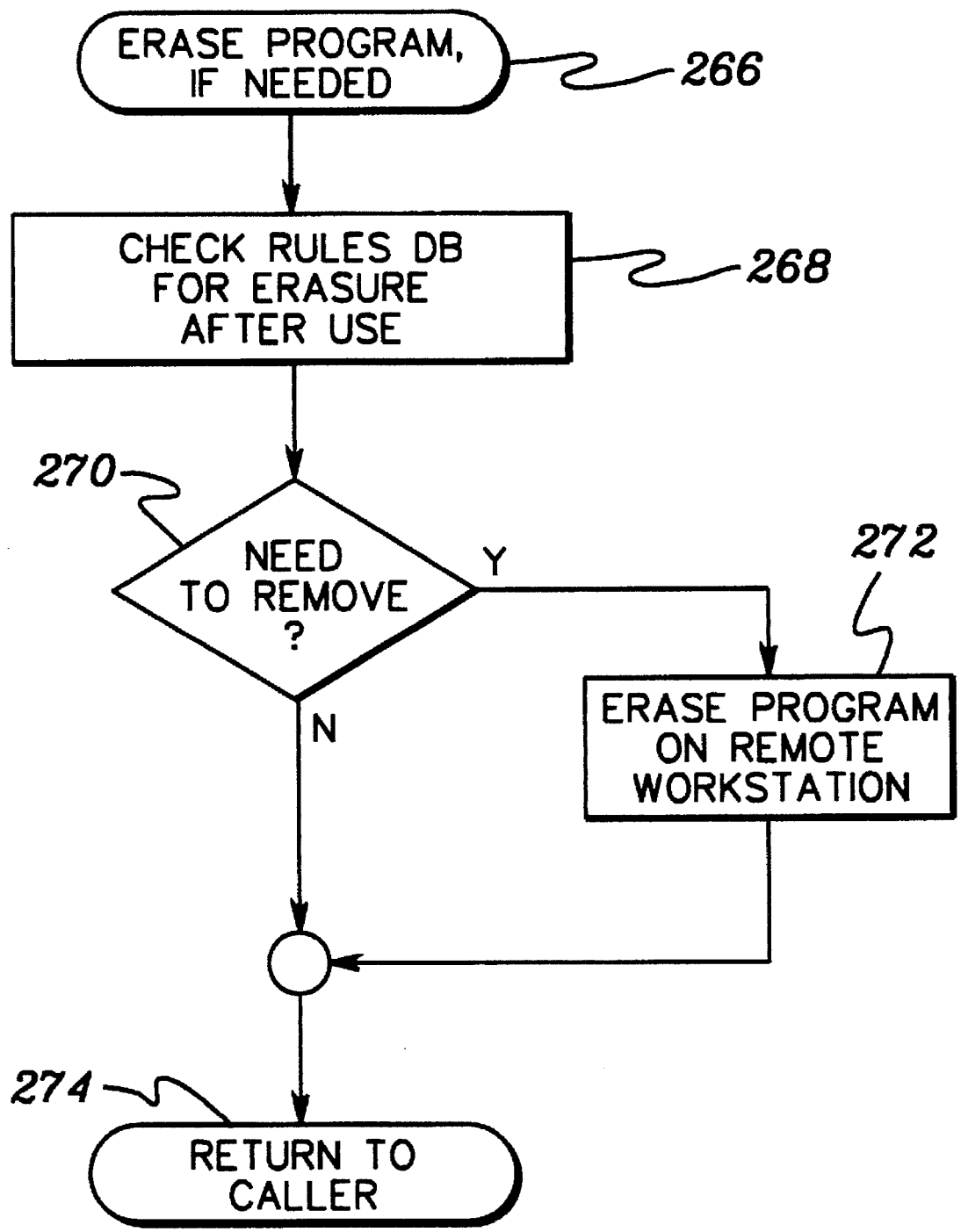
FIG. 5 is a flowchart of one embodiment of the erase program process step of FIG. 3.

Either as a security mechanism, or for resource conservation, the diagnostic routine established at the remote workstation can then be erased 234. FIG. 5 presents one processing flow for such a sub-routine. Upon being called, the erase program sub-routine 266 initially directs that the rules database be checked to determine whether the subject diagnostic routine should be erased from the remote workstation undergoing diagnostic analysis 268. If the rules database does not require erasure 270, then return is simply made to the point of call 274, while if erasure is designated, the program is erased on the remote workstation 272 using the described file transfer and remote command execution of the co-pending application. After erasing the program, processing returns to the main monitor routine 236 of FIG. 2.

Figure 6:
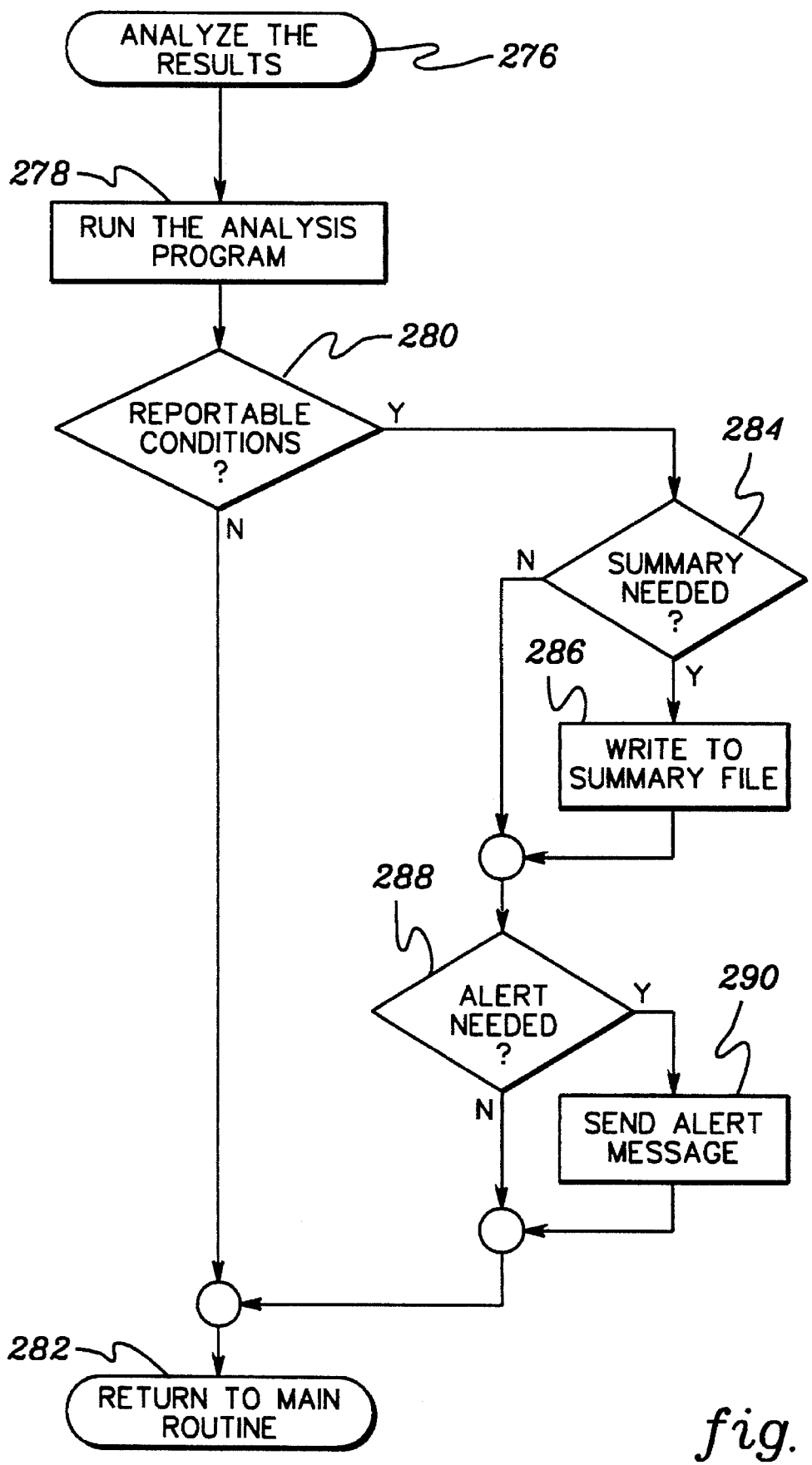
FIG. 6 is a flowchart of one embodiment of the analyze results process step of FIG. 2.

A final step in the main monitor routine of FIG. 2 is to analyze the results 216 that have accumulated in the reports database. FIG. 6 presents one overview of an analyze results sub-routine 276. The predefined analysis program is run 278 and inquiry is made whether a reportable condition exists 280. If no such condition exists, return 282 is made to the main monitor routine where processing loops back to obtain a next step in the given task. Assuming that a reportable condition does exist, then with reference to the rules database, processing inquires whether a summary report is needed 284. If "yes," then the report is written to a summary file 286. Thereafter, processing determines whether an alert is defined in the rules database for the present condition 288. If so, an alert message 290 is sent, for example, for display on a monitor 114 (FIG. 1) of a workstation 110 used by a system administrator. Thereafter, return 282 is made to the point of call.

To summarize, the automated method and system for remote workstation inventorying and monitoring presented herein can eliminate a significant amount of the manual effort otherwise required to run diagnostic tools and search through multiple workstations to identify an underlying cause of a system problem. With the system and method presented herein, the availability and performance of a local area network can be improved. In addition, preventive procedures such as virus scans can be more readily performed, thereby facilitating early problem detection.

Indirectly, the system and method can assist all users of the distributed computing system to work more efficiently since system interruptions can be reduced, thus ensuring a normal, stable computing environment. In cases where a system problem may have been caused by an inappropriate hardware or software configuration change, the present invention facilitates quick identifying of recent configuration changes on the workstations in the distributed computing environment. The system and method can be readily configured by one of ordinary skill in the art to implement one or more commercially available, diagnostic routines such as those mentioned herein above.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

We claim:

1. A monitor system for use in a distributed computing environment having a plurality of workstations, including a local workstation and a remote workstation, interconnected by a network, said monitor system for monitoring said remote workstation from said local workstation, said monitor system comprising:

communication means at each workstation of said plurality of workstations for communicating via said network with other workstations of said plurality of workstations;

a diagnostic routine at said remote workstation for monitoring a configuration characteristic of said remote workstation and for providing based thereon a report file, said diagnostic routine being responsive to an execute command sent from said local workstation to said remote workstation via said communication means, said communication means being operable to initiate from said local workstation the execution of said diagnostic routine and to transfer said report file from said remote workstation to said local workstation;

monitor means at said local workstation for automatically and periodically, in accordance with a diagnostics schedule, generating said execute command to be sent to said remote workstation via said communication means; and analysis means at said local workstation for analyzing the report file transferred from said remote workstation to said local workstation.

2. The monitoring system of claim 1, further comprising:

secondary monitor means at another workstation of said plurality of workstations of said distributed computing environment, for alternatively generating said execute command and serving as said local workstation when said local workstation is disabled; and control-point arbitration routine at each of said local workstation and said another workstation for determining when to employ said another workstation in place of said local workstation for providing the monitoring.

3. The monitor system of claim 1, wherein said distributed computing environment comprises a local area network, said local workstation comprising other than a local area network server station, and wherein said communication means comprises a peer-to-peer communication protocol.

4. The monitor system of claim 3, wherein said monitor means includes a database containing the diagnostic routine, and wherein said monitor system further comprises means for transferring the diagnostic routine from said local workstation to said remote workstation via said communication means using a remote file transfer procedure.

5. The monitor system of claim 4, further comprising means for remotely erasing said diagnostic routine from said remote workstation via said communication means, said means for remotely erasing residing at said local workstation and being responsive to said monitor means.

6. The monitor system of claim 3, wherein said monitor means includes a database containing said diagnostic routine, and wherein said monitor system further comprises means for verifying accuracy of said diagnostic routine disposed at said remote workstation using said diagnostic routine disposed at said local workstation.

7. The monitor system of claim 1, wherein said diagnostic routine comprises a hardware diagnostic routine or a software diagnostic routine and wherein said monitor system includes a rules database containing said diagnostic schedule for execution of said diagnostic routine at said remote workstation.

8. The monitor system of claim 7, wherein said plurality of workstations of said distributed computing environment includes multiple remote workstations interconnected to said local workstation by said network, said monitor system monitoring from said local workstation each of said multiple remote workstations, and wherein said rules database contains a list of said multiple remote workstations and a time schedule for monitoring each of said multiple remote workstations in said list.

9. The monitor system of claim 7, wherein said analysis means includes means for referencing said rules database and for providing an alert message if a predefined condition contained therein exists, said analysis means including means for transferring said alert message to an alert workstation for display on an associated display device, said alert workstation comprising a workstation of said plurality of workstations.

10. The monitor system of claim 8, further comprising a report database containing report files for said multiple remote workstations in said list, said report database further comprising means for tracking an interval of time that a particular remote workstation of the multiple remote workstations is off-line from the network.

11. In a distributed computing environment containing a plurality of workstations, including a local workstation and a remote workstation, interconnected by a network, an automated method for monitoring from the local workstation a configuration characteristic of the remote workstation, said method comprising the steps of:

a) generating an execute command at the local workstation and periodically, in accordance with a monitor schedule, transferring said execute command to the remote workstation;

(b) responsive to said execute command of said step (a), automatically executing at the remote workstation a diagnostic routine to monitor said configuration characteristic of said remote workstation, and providing based thereon a representative report file;

(c) transferring the representative report file from the remote workstation to the local workstation; and (d) analyzing at the local workstation the representative report file transferred from the remote workstation.

12. The method of claim 11, wherein said generating step (a) includes referencing a predefined rules database for said monitor schedule and generating said execute command based upon said monitor schedule.

13. The method of claim 12, wherein said execute command transferring of said step (a) employs a peer-to-peer communication protocol in transferring said execute command from said local workstation to said remote workstation.

14. The method of claim 11, wherein said local workstation includes a repository database containing said diagnostic routine, and wherein said method further comprises transferring the diagnostic routine from the local workstation to the remote workstation using a remote file transfer procedure prior to said generating step (a).

15. The method of claim 14, further comprising the step of remotely erasing the diagnostic routine from the remote workstation after executing the diagnostic routine at the remote workstation.

16. The method of claim 11, wherein the local workstation includes a repository database containing the diagnostic routine, and wherein said method further comprises prior to said step (b) comparing said diagnostic routine at the local workstation with the diagnostic routine at the remote workstation, and replacing the diagnostic routine at the remote workstation with the diagnostic routine at the local workstation if a difference is detected from said comparing.

17. The method of claim 16, wherein said local workstation includes a rules database, and said method further comprises providing an alert message whenever a predefined condition contained in said rules database is met.

18. The method of claim 11, wherein said plurality of workstations of said distributed computing environment contains multiple remote workstations, and wherein said automated method monitors from the local workstation at least one configuration characteristic of each remote workstation by repeating said steps (a)–(d) for each workstation of the multiple remote workstations.

19. The method of claim 11, further comprising the step of identifying when the remote workstation is off-line from the network, and tracking a time interval that the remote workstation is off-line.

* * * * *

UNITED STATES PATENT AND TRADEMARK OFFICE
CERTIFICATE OF CORRECTION

PATENT NO. : 5,491,791
DATED : Feb. 13, 1996
INVENTOR(S) : Glowny et al.

It is certified that error appears in the above-indentified patent and that said Letters Patent is hereby corrected as shown below:

Column 3, line 20, delete "Summarize" and substitute therefor --summarize--.

Column 6, line line 17 of the database, delete "step-n e" and substitute therefor --step-name--.

Column 6, line 25 of the database, delete "task-n" and substitute therefor --task-name--.

Column 7, line 2 of the database, delete "tank-list" and substitute therefor --task-list--.

Column 7, line 6 of the database, delete "swanly" and substitute therefor --swonly--.

Signed and Sealed this

Eighteenth Day of June, 1996

*Attest:*

BRUCE LEHMAN

*Attesting Officer*      *Commissioner of Patents and Trademarks*